(No Model.)
B. WILLIAMS.
MANNER OF MAKING AND COOLING JOINTS FOR ELECTRICAL CONDUITS.
No. 358,095. Patented Feb. 22, 1887.
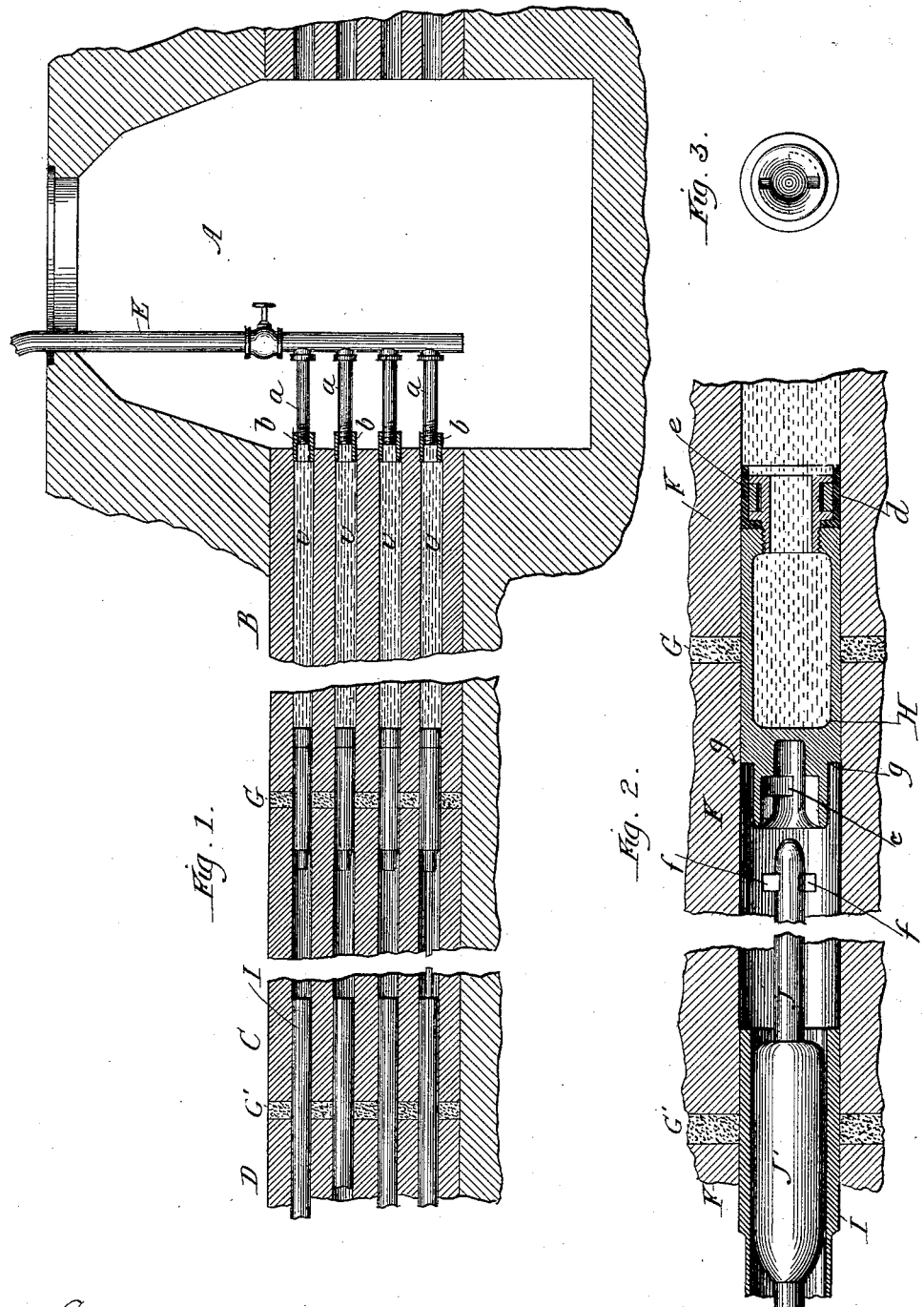
Witnesses:
E. A. West.
O. W. Bond.
Inventor:
Benezette Williams

UNITED STATES PATENT OFFICE.

BENEZETTE WILLIAMS, OF CHICAGO, ILLINOIS.

MANNER OF MAKING AND COOLING JOINTS FOR ELECTRICAL CONDUITS.

SPECIFICATION forming part of Letters Patent No. 358,095, dated February 22, 1887.

Application filed November 2, 1886. Serial No. 217,844. (No model.)

*To all whom it may concern:*

Be it known that I, BENEZETTE WILLIAMS, residing at Chicago, in the county of Cook and State of Illinois, and a citizen of the United States, have invented a new and useful Improvement in the Manner of Making and Cooling Joints for Electrical Conduits, of which the following is a full description, reference being had to the accompanying drawings, in which—

Figure 1 is a vertical section; Fig. 2, an enlarged detail. Fig. 3 is an end view of the bayonet-joint of the plug, lettered H in the drawings, showing the end which is intended to receive the rod J and its projections $ff$.

It is common in laying electrical conduits to use sections each containing several passages, and it is essential that the joints between the sections be perfectly made, and that the passages at the joints be continuous. It is common to use hot cement at the joints; and the leading object of this invention is to provide an improved method and improved devices for forming and cooling the joints between the sections of the conduit and maintaining the continuity of the passages, which I accomplish by introducing water into the passages, as illustrated in the drawings and hereinafter described.

That which I claim to be new will be set forth in the claims.

In the drawings, A represents a man-hole; B, one section of a conduit, one end of which is inserted in the man-hole; C and D, two other sections of conduit.

The conduit has, as shown, any desired number of separate passages $v$. As the several joints are formed they are cooled by means of water, which is introduced into the passages. This may be done as represented in Fig. 1, in which E represents a pipe leading from any suitable water-reservoir, which pipe is provided with a number of branch pipes, $a$, one for each of the passages in the conduit. Each of these pipes $a$ is provided, as shown, with a suitable hollow plug, $b$, adapted to fit tightly into the passages $v$. If desired, the pipe E and the branch pipes $a$ may be flexible.

In Fig. 2, F are the walls of a single duct or conduit in sections of pipe. G G' are two joints which are being made. H is a hollow movable plug, one end of which is provided with a bayonet-catch, $c$. $d$ is a packing fitted to the end of the plug H, and $e$ is an expansion-ring, which keeps the packing tight against the wall of the duct. The duct is filled with water, which flows through E and one of the pipes $v$, which water also enters the hollow plug H.

I is a tube inserted in the duct before the joint at G' is made, which tube passes beyond the joint.

J is a rod having an enlargement, J', which fits inside of the tube I. The inner end of this rod is provided with pins or projections $f$, to engage with the bayonet-catch on the plug H.

The operation is as follows: Hot cement having been inserted for the purpose of forming the joint at G', the rod J is made to engage with the bayonet-catch $c$, and then the plug H can be drawn forward until the shoulders $g$ engage with the end of the pipe I; then, continuing to pull upon the rod J, the plug H, with the pipe I, can be drawn forward until the hollow portion of the plug H comes to the joint G'. Then the rod J can be disengaged from the plug, and it and the pipe I can be removed from the section, leaving the plug H, which is filled with water, to stand while the next section of pipe is being laid. As the plug H is drawn along water flows into the duct, keeping it filled, and after the plug has been drawn away from the joint the water will continue to cool the cement at the joint. The packing $d$ prevents the water flowing beyond the plug.

I do not limit myself to the exact way shown of supplying water to the passages. When the conduit is laid nearly on a level, the pipe E and branch pipes $a$ may be dispensed with, and the water can be allowed to flow, if desired, into the man-hole to the desired height to flow into the passages, the passages on the opposite side of the man-hole being closed, if desired, by suitable plugs.

What I claim as new, and desire to secure by Letters Patent, is—

1. The method of cooling the cement used in making the joints of electrical conduits by the introduction of water into the passages, substantially as specified.

2. A device for forming and cooling joints of electrical conduits, consisting of the plug H, provided with a packing at one end and at the other end adapted to engage with a rod, in combination with a tube, I, and rod J, adapted to engage with the plug H, substantially as and for the purpose specified.

BENEZETTE WILLIAMS.

Witnesses:
E. A. WEST,
O. W. BOND.